Patented Feb. 12, 1935

1,990,751

UNITED STATES PATENT OFFICE 1,990,751

PRODUCTION OF BASE EXCHANGE AND SIMILAR MATERIALS

Oliver C. Ralston, Clarkdale, and Kenneth Michael Baum, Yuma, Ariz.; Emmett J. Culligan, administrator of said Kenneth M. Baum, deceased, assignor of the entire right of said Baum to Arizona Minerals Corporation, Yuma, Ariz., a corporation of Arizona No Drawing. Application September 26, 1930, Serial No. 484,706

14 Claims. (Cl. 23—113)

This invention relates to the production of base exchange, adsorbent and catalytic materials and has for an object the provision of an improved process for preparing such materials. More particularly, the invention contemplates the provision of an improved wet method of preparing artificial zeolites. The invention further contemplates the production of improved zeolite products.

According to the heretofore customary practices, zeolites have been prepared by fusion processes and wet processes. The fusion processes commonly used involve the melting of suitable ingredients to produce fluid, homogeneous, glass-like masses which are subsequently hardened and crushed or broken to produce small granules and washed to remove free alkali salts. The wet processes commonly used involve the production of gelatinous precipitates in liquid suspension or the production of complete jellies by mixing solutions of suitable reagents. The complete jellies are rigid structures embodying all of the solvents employed and all of the reaction products.

The fluid products containing the gelatinous precipitates are usually filtered and the precipitates washed to remove a portion of the free alkali salts formed by the reaction resulting from the mixing of the solutions. The washed products are dried to form hard, brittle cakes which are further washed and granulated to produce particles of desired sizes. The complete jellies produced are sometimes dried without washing to remove free alkali salts in an effort to produce material in the form of brittle cakes in which the gel structures are retained. The cakes so produced are washed and granulated to provide particles of suitable sizes and substantially identical with the granules produced from dried precipitate cake.

The glass-like substances produced by the fusion processes, and the dried cake material produced by the wet processes all have the property of decrepitating into granules when subjected to the action of water. In the case of products of wet processes, the character of the decrepitation appears to depend to some extent upon the water content of the dried cake. The material will not decrepitate until drying has proceeded to a certain extent, and, when drying has been carried on for too long a period, decrepitation may result in the production of undesirable amounts of very fine particles. It is therefore desirable to avoid over-drying and to obtain an evenly dried product, but it is difficult to obtain an evenly dried product by the heretofore customary processes because the precipitates and jellies shrink and crack in drying to produce cakes of different sizes which proceed to the final dry condition at different rates.

While no definite explanation of the property of decrepitation is known, it is generally believed that it may be at least partly attributed to hydration or swelling of the dried materials resulting from immersion in water and/or dissolution of the soluble alkali salts contained in the dry materials. It is believed that another factor of great importance in producing decrepitation is the air pressure caused by the rush of water into the sub-microscopic capillaries. Consequently, the size, shape and number of these capillaries are of great importance, and these features are no doubt modified by the physical character of the drying mass and by the method of drying.

The process of our invention involves control of conditions under which the products resulting from the mixing of solutions of reagents are formed and/or control of conditions under which the products are dried. The dry products of the heretofore customary processes, while capable of granulating or decrepitating to some extent upon treatment with water, are of such natures that granulation cannot be controlled satisfactorily. In some instances decrepitation proceeds to such an extent that large amounts of very fine particles are produced. In other instances decrepitation proceeds only slightly, with the result that large amounts of relatively large particles, too large for ordinary commercial purposes, are produced, and it is necessary to subject the large particles thus produced to crushing or grinding operations to produce granules of suitable sizes. The nature of the dry products and the character of the available crushing or grinding machinery are such that it is difficult to avoid the production of undesirable amounts of fine particles when crushing or grinding operations are necessary.

We have discovered that a dry cake or material which granulates readily to produce highly desirable quantities of suitably sized particles may be produced by controlling the conditions under which complete jellies and gelatinous precipitates are produced and/or dried. We have found that dry products which decrepitate very satisfactorily may be produced by drying complete jellies and gelatinous precipitates at low temperatures. Drying may be continued until immersion in water of a sample of the material being dried indicates that a satisfactory decrepitating stage has been reached.

In carrying out the processes of our invention we conduct the drying operation within the temperature range of 32° F. to 120° F. and preferably between 70° F. and 100° F. We have found that improved results may be obtained when the heat is applied to the upper surface of the material being dried. This may be accomplished by placing heating elements above the material being dried or by passing a current of heated air over the surface of the material in suitable containers. We have used solar drying with great success, the products obtained being superior to those obtained in carrying out processes involving the use of other heating means.

In forming zeolites for commercial purposes by first producing complete jellies, we may form the jellies by mixing the usual reagents in suitable proportions with only sufficient stirring or agitation to cause thorough mixing. After the complete jellies have been formed, the drying operation may be commenced, and the drying may be continued at a low temperature until tests indicate that it is capable of decrepitating satisfactorily.

The drying of complete jellies under the conditions and at temperatures within the range described above results in the production of improved products, but we have found that better and more uniform products may be obtained by forming and drying gelatinous precipitates under controlled conditions. We, therefore, prefer to produce and treat gelatinous precipitates as distinguished from complete jellies. The gelatinous precipitates may be produced by first forming a complete jelly and then breaking the jelly by means of an agitator or similar device to form a fluid pulp, or by mixing reagents with water under conditions of thorough agitation to prevent the formation of a complete jelly.

A complete preferred process of our invention involves the mixing of suitable reagents in suitable proportions and with sufficient stirring or agitation to prevent the formation of a complete jelly, followed by gradual elimination of excess water by drying alone or by decantation and drying. The mixing operation should be so conducted that the components of the resulting product will separate upon standing undisturbed to form a layer of precipitate covered by a layer of supernatant mother liquor. We prefer to dry the precipitate without any preliminary washing, but, if desired, washing of the precipitate after partial or complete decantation of supernatant liquid, or washing after partial drying and before the decrepitation stage has been reached, may be conducted.

We prefer to conduct the mixing operation in agitator tanks or other receptacles which are particularly suitable for that purpose and transfer the resulting product to separate pans or receptacles for drying. We have found it to be advantageous to produce a relatively thin or highly fluid product of the mixing operation in order to permit transfer by means of pumps from the mixing receptacle to the drying pan or receptacle. Proper fluidity may be obtained by using suitably dilute solutions of reagents or by using concentrated solutions of reagents and adding water after the mixing operation has been completed.

The product of the mixing operation is pumped to the drying pans where separation of the components commences immediately. Upon standing, the precipitate settles to form a compact mass covered by mother liquor. Heat may be applied at any time after the material has been placed in the drying pans. When a satisfactory separation of precipitate and mother liquor has been accomplished, the supernatant mother liquor may be withdrawn, but we have found it to be advantageous to permit at least a portion of the mother liquor to remain in contact with the precipitate during the early stages of the drying operation.

The preferred process of our invention is particularly suitable for use in conjunction with solar evaporation. The fluid product of the mixing operation can be pumped readily long distances and we may, therefore, use large and extensive drying pans. Such drying apparatus may be of very simple construction, consisting essentially of large platforms having level surfaces covered with layers of impervious material and provided with suitable side walls for confining the fluid. The drying platforms may be provided with roofs or not, as desired. Furthermore, since the heat for drying is available without cost, no penalty is attached to the use of sufficient water to give the desired fluidity or to permitting the mother liquor to remain in contact with the precipitate during the drying operation. The quantity of water employed and the procedure with respect to decantation will be governed to some extent at least by weather conditions and available drying pan area.

The nature of our preferred process is such that many economies which cannot be achieved by the heretofore customary processes may be observed. Thus, for example, we have eliminated the filtering and washing operations which have been employed in the heretofore customary processes dealing with the production and drying of gelatinous precipitates. Furthermore, the retention of the mother liquor in the precipitate mush permits pumping of the material directly from the mixing apparatus or from a storage receptacle to the drying pans or solar evaporating fields. The installation and operating costs of pumps are trifling in comparison with those of filters, conveyors and their auxiliaries.

The final products of the processes of our invention have higher base exchange capacities than the products of the heretofore customary processes. The better commercial products of the heretofore customary processes could not be produced consistently with more than twelve thousand grains of $CaCO_3$ base exchange capacity per cubic foot of particles between 10 and 20 mesh in size. Our products have capacities expressed in grains of $CaCO_3$ per cubic foot of 10 to 20 mesh particles, of over fourteen thousand and frequently of over sixteen thousand.

In carrying out the preferred process of our invention, we prefer to form separate solutions of the different reagents and mix the solutions under such conditions that the production of a complete jelly is prevented. In forming sodium aluminum silicates, we prefer to employ solutions of sodium silicate and sodium aluminate in such proportions that a reaction product containing five to six molecules of $SiO_2$ to each complete molecule of the resulting compound is produced. Such a product will probably consist of a mixture of compounds having the formulae $Na_2O.Al_2O_3.5SiO_2$ and $Na_2O.Al_2O_3.6SiO_2$.

The following example will serve to illustrate the preferred process of our invention. A solution containing 350 gallons of water and 89 pounds of sodium aluminate containing 58 per cent $Al_2O_3$ is mixed thoroughly in an agitation tank with a solution formed by diluting 53 gallons of 43 degree Baumé water glass (analysis corresponding to $Na_2O.3SiO_2$) with 300 gallons of water. Agitation or stirring is continued until reaction is complete and a fluid pulp containing precipitate suspended in mother liquor is produced. The resulting pulp is of about the consistency of cream and it is pumped to a solar drying field provided with large concrete drying floors or platforms having peripheral retaining walls. The pulp is placed on the drying floors to a depth of three or four inches and subjected to the heat of the sun's rays until a brittle cake capable of decrepitating is produced. The pulp spreads evenly and a dried cake of uniform thickness is obtained.

During the early stages of the drying operation the precipitate settles and is protected from the direct action of the sun's rays by a layer of clear mother liquor. While the water contained in the covering liquid is evaporating, the precipitate settles to form a compact mass or layer which has the appearance of a wet mass or layer of a crystalline substance such as salt or sugar.

The pulp, when produced, contains more than twenty-five pounds of water per pound of solids and it offers little or no resistance to the passage of a knife blade until it has dried to an incipient cake containing about ten pounds or less of water per pound of solids. It, therefore, retains its homogeneity during drying better than any previously known product.

The cake, if undisturbed during drying, shrinks and cracks to form smaller cakes of different sizes and shapes before drying is completed. This may result in uneven drying which will make it difficult to have all of the material reach the most desirable decrepitating condition at the same time. In order to overcome the tendency for the material to break into cakes of irregular shapes and sizes, we find it advisable to cut the mass into small cakes before drying has been completed and before cracking due to shrinkage has progressed to any considerable extent. A series of parallel vertical cuts may be made to produce a number of parallel strips which will break into smaller cakes of rather uniform size in shrinking. Small cakes having no dimension greater than several inches will pass through the final drying period without breaking further to any considerable extent and drying will be uniform.

In order to better explain our processes and without limiting the scope of our invention, the following hypothesis, based on accepted colloid theory, is advanced. If a sol is allowed to set into a gel, the solution will be bound in a rigid structure made up of cells known as micellae. Authorities differ on whether the micellae consist of a closed honeycomb structure or whether the cell walls form a sponge-like structure through which the intermicellar liquid can flow or drain. Probably different colloids vary. Some of the large single cells in wood are almost certainly closed. In the case of the zeolite gels, which resemble silica gels, the evidence is not so clear. The cellular structure must be there, both in the complete jelly and in the gelatinous precipitate. A precipitate forms either from a very dilute mixture or from an ordinary mixture which is stirred during reaction. This feathery precipitate entangles a great deal of mother liquor just as wet feathers can retain an immense amount of water. If a jelly is broken mechanically, many of the cell walls are ruptured and the mass reduces to a gelatinous precipitate. It seems reasonable to suppose that a precipitate suspended in mother liquor would allow passage of the mother liquor to the surface for drying more easily than does a complete jelly whose cell-walls would tend to interfere with free passage of water. This illustrates one of the advantages of drying a gelatinous precipitate in comparison with drying a complete jelly.

We have noted another great advantage in drying a mush of precipitate. The jelly structure of a complete jelly is rigid, as comb honey is rigid, and in drying a mass containing 96% water to a cake containing 50% water, a shrinkage to less than 10% of the original volume occurs. Unequal drying causes the complete jelly to be put under strain and it tears apart into unequally sized pieces during this shrinkage. The smaller cakes then overdry and do not decrepitate to the desired commercial sizes while the large cakes under-dry and also will not decrepitate efficiently. The same is true of a filter cake of precipitate as formed by heretofore customary processes, for the reason that the cake is not equally compacted when placed in the drier. In the case of a precipitate mush drying, the shrinkage cracks do not appear as early. For the mixture given in the example above, a complete jelly begins to show shrinkage cracks when the average moisture of the drying jelly reaches about 11.5 to 12 pounds of water per pound of anhydrous solids. The same mixture if reduced to a precipitate mush will not show shrinkage cracks until the moisture has been reduced to about 7 to 8 pounds of water per pound of anhydrous solids. By cutting the mush with knives, as mentioned above, uniformity of drying can be furthered. Also, if rapid drying takes place only at one end of a cake, moisture travels through the cake as through a wick and equalizes the differenece. As the mass sets into a hardening mud, a profound rearrangement takes place and the final dried cake is similar in appearance to the dried cakes produced by all other wet methods. This rearrangement toward the end of drying is not so profound as a recrystallization but much more profound than the hardening of drying mud. The cell walls of the gelatinous structure are probably collapsed.

We claim:—

1. The method of preparing an artificial zeolite which comprises mixing solutions of sodium aluminate and sodium silicate under conditions of thorough agitation to form a precipitate in fluid suspension, and subjecting the resulting product to a low temperature drying operation.

2. The method of preparing an artificial zeolite which comprises mixing solutions of sodium aluminate and sodium silicate under conditions of thorough agitation to form a precipitate in suspension in mother liquor, and subjecting the resulting product to a solar drying operation.

3. The method of preparing an artificial zeolite which comprises mixing solutions of reagents under such conditions as to form a complete jelly, breaking the jelly to produce a fluid pulp, and subjecting the resulting pulp to a low-temperature drying operation.

4. The method of preparing an artificial zeolite which comprises forming a complete jelly by mixing solutions of sodium aluminate and sodium silicate, breaking the jelly to produce a fluid pulp, and subjecting the resulting pulp to a low-temperature drying operation.

5. The method of preparing an artificial zeolite which comprises forming a pulp in which a gelatinous precipitate is suspended in mother liquor, and subjecting the entire pulp containing the mother liquor and the precipitate to a drying operation until a brittle cake is obtained.

6. The method of preparing an artificial zeolite which comprises mixing solutions of sodium aluminate and sodium silicate under conditions of thorough agitation to form a precipitate in suspension in mother liquor, and subjecting the entire pulp containing the mother liquor and the precipitate to a drying operation until a brittle cake is obtained.

7. The method of preparing an artificial zeolite which comprises mixing solutions of reagents under such conditions as to form a complete jelly, breaking the jelly to produce a fluid pulp, and drying the resulting pulp at a low temperature to obtain a brittle cake.

8. The method of preparing an artificial zeolite which comprises forming a complete jelly by mixing solutions of sodium aluminate and sodium silicate, breaking the jelly to produce a fluid pulp, and drying the resulting pulp at a low temperature to obtain a brittle cake.

9. The method of preparing an artificial zeolite which comprises mixing solutions of sodium aluminate and sodium silicate under conditions of thorough agitation to form a precipitate in suspension in mother liquor, pumping the resulting pulp to a suitable drying receptacle, and drying the entire pulp at a low temperature until a brittle cake is obtained.

10. The method of preparing an artificial zeolite which comprises mixing solutions of reagents under conditions of thorough agitation to prevent the formation of a jelly and to form a precipitate in fluid suspension, and subjecting the entire pulp containing the mother liquor and the precipitate to a low temperature drying operation.

11. The method of preparing an artificial zeolite which comprises mixing two or more reagents under such conditions that a gelatinous precipitate in fluid suspension is produced, and subjecting the entire resulting pulp containing the mother liquor and the precipitate to a drying operation at a temperature not lower than about 70° F. and not higher than about 100° F.

12. The method of preparing an artificial zeolite which comprises mixing solutions of sodium aluminate and sodium silicate under such conditions that a gelatinous precipitate in fluid suspension is produced, and subjecting the entire resulting pulp containing the mother liquor and the precipitate to a drying operation at a temperature not lower than about 70° F. and not higher than about 100° F.

13. The method of preparing an artificial zeolite which comprises mixing two or more reagents under such conditions that a gelatinous precipitate in fluid suspension is produced, and subjecting the entire resulting pulp containing the mother liquor and the precipitate to a drying operation at a temperature not higher than about 120° F.

14. The method of preparing an artificial zeolite which comprises mixing solutions of sodium aluminate and sodium silicate under such conditions that a gelatinous precipitate in fluid suspension is produced, and subjecting the entire resulting pulp containing the mother liquor and the precipitate to a drying operation at a temperature not higher than about 120° F.

OLIVER C. RALSTON.
KENNETH MICHAEL BAUM.